United States Patent Office" 3,471,306
Patented Oct. 7, 1969

3,471,306
REFRACTORY RESISTANT TO MOLTEN ALUMINUM
Jack Alvin Rubin, Glendale, Calif., and Robert Anthony Gdula, Wappingers Falls, N.Y., assignors to Interspace Corporation, Los Angeles, Calif., a corporation of Delaware
No Drawing. Continuation-in-part of application Ser. No. 542,710, Apr. 12, 1966. This application July 16, 1968, Ser. No. 745,140
Int. Cl. C04b 35/18
U.S. Cl. 106—63     10 Claims

ABSTRACT OF THE DISCLOSURE

A process for making a refractory which is resistant to attack by molten aluminum and its alloys by intimately mixing a pre-calcined granular grog containing $SiO_2$ and $Al_2O_3$ with a finely divided mixture of bond-forming components containing $Al_2O_3$, $B_2O_3$ and CaO, moistening the above mixture with water, pressing the moistened mixture to form a shaped object, and firing same to form a glassy bond in situ, said firing being insufficient to reduce the porosity of the fired object to below about 25%. A preformed and fired refractory object which is resistant to molten aluminum having a porosity of from 25% to 35%.

Related application

The present application is a continuation-in-part of our co-pending application Ser. No. 542,710, filed Apr. 12, 1966, now abandoned.

Background of the invention

Refractories used heretofore in furnaces containing molten aluminum and its alloys have been made from expensive high alumina raw materials, have been generally very dense, employed exotic bonds or bonding compositions which were expensive and sometimes hazardous, and had low porosity. Prior refractories containing between 75% and 90% of alumina grain were often bonded with phosphate-type bonds which represent a hazard when rebuilding a furnace constructed of such brick; the reaction between the phosphate bond and the molten aluminum alloys forms phosphides in the spent brick which spontaneously ignite in contact with moisture. The extremely vitreous and dense products of the prior art often fail because of their poor resistance to spalling.

Summary of the invention

Whereas it has been heretofore thought necessary to employ refractories having a high content of alumina and low porosity, the present invention is based upon the discovery that successful refractories for the purpose stated can be manufactured with an alumina content of as low as 41%–42%, the major component of the refractory of this invention consisting of a calcined, granular grog containing silica in excess of alumina. Moreover, the silica may be present as free silica (preferably in the form of cristobalite and amorphous silica) and mullite. Such grog can be readily made from readily available fire clays and kaolinitic materials. Furthermore, instead of incurring the expense of preparing special vitreous and corrosive glasses or frits and grinding them before intermixing with alumina to make a refractory body mix (which mix is extremely abrasive upon dies during pressing), the present invention employs readily available bond-forming components which are not abrasive and an ultimate glassy bond is formed in situ during firing.

The fired refractories of the present invention are extremely resistant to molten aluminum and its alloys and evidence very little penetration by the molten metal; dross does not accumulate on their surfaces and as a result the capacity of a furnace is maintained. The refractories have a porosity of at least 25% and may reach as high as 35% or above, are resistant to spalling, have low thermal conductivity and low specific heat. The latter two advantages, i.e., low thermal conductivity and low specific heat, are very important in that they significantly reduce the amount of fuel necessary in heating, e.g., a furnace made from refractory of this invention.

An object of the present invention therefore is to disclose and provide a method of manufacture and a refractory which is imminently suited for use in contact with molten aluminum and alloys thereof.

A further object of the invention is to disclose and provide a method and a refractory wherein a glassy bond is formed in situ, said bond being produced from very inexpensive material.

Another object of the invention is to embody a refractory that is extremely resistant to molten aluminum and alloys thereof and, at the same time, has a porosity of at least 25%.

A still further object of the present invention is to disclose a process for manufacturing a refractory having a glassy bond, wherein the CaO necessary for forming the bond is derived from $Ca(OH)_2$.

Other advantages and objects will become apparent to those skilled in the art from the following detailed description of the process, its mode of operation, and properties of the refractories resulting therefrom.

Description of the preferred embodiments

Although the use of siliceous materials as the major body component is contrary to the teachings of the prior art, the present invention utilizes a body mix of which over 70%, e.g., between about 70% and 92% by weight (preferably 75%–90%) is composed of a calcined granular grog containing silica in excess of alumina. The clay substance used in making the grog may be kaolinitic, or of the fire clay type; a refractory kaolinitic material, high in silica, recovered from sand deposits near Ione, Calif. (and known in ceramic circles as Ione grain) has been found eminently suited for use in making the calcined grog in brick of the present invention. Any calcined grog of satisfactory refractoriness containing from 52 to 55% of silica (generally in the form of mullite, cristobalite and amorphous silica) and 42 to 45% $Al_2O_3$ may be employed. Such calcined grog is preferably of a graded particle size and it may be stated that not over 20% should remain on a 10 mesh and not over 25% pass a 65 mesh. It is preferable that the major proportion of the grog pass the 10 mesh and be retained on a 65 mesh sieve.

To the above described granular calcined grog there is then added a finely divided or powdered mixture of bond-forming components, preferably virtually all of the bond-forming components pass a 100 mesh sieve. In dry or calcined form these mixed components should contain from between about 0.5% and 69% $Al_2O_3$, between 15% and 80% $B_2O_3$ and between 15% and 45% CaO. Preferably however the $Al_2O_3$ content of such mixed components should be within the range 0.5–45%. The boron oxide content of these components can be most readily derived from boric acid, or vitreous boric acid anhydride. The lime content can be most readily obtained from hydrated or slaked lime ($Ca(OH)_2$), and various calcium salts such as the sulfate and acetate. Colemanite ($CaO.B_2O_3.H_2O$) and other hydrated calcium borate minerals such as inyoite and meyerhofferite can be used as a source of both lime and boron oxide.

The $Al_2O_3$ content of the bond-forming components may be derived from calcined or tabular aluminum oxide, alumina hydrates such as bohmite, gibbsite, diaspore, and bayerite, but salts of aluminum such as chloride, nitrate, sulfate, acetate, etc. may be employed. Aluminum borates and calcium aluminates may be used as effective sources of these components. The use of calcium carbonate is apt to produce a refractory of reduced strength, and is not recommended.

It should be noted that in computing the amount of bonding components in the fired refractory, one must take into account that the $B_2O_3$ and the CaO, which are the bonding components, together with the $Al_2O_3$, are not, generally, added as such. Preferably, the $B_2O_3$ is in the form of boric acid and the CaO is in the form of calcium hydroxide. When the refractory is fired, water is liberated both from the boric acid and from the calcium hydroxide to form, respectively, $B_2O_3$ and CaO. Since a certain portion of the bonding components are lost during firing, the amount of bonding components mixed with the grog will be slightly in excess of the amount of bond in the final product. However, this difference is minor and can be easily determined.

These various bond-forming components are preferably very finely divided or powdered and are intimately mixed with the granular grog so that the mixture of body-forming materials comprises between about 70% and 92% by weight of the grog and 8% to 30% by weight of a mixture of $Al_2O_3$, CaO and $B_2O_3$ in powder form. It should be noted again that if CaO is in the form of $Ca(OH)_2$ and $B_2O_3$ in the form of boric acid, about 36% of said mixture will have to be added to the grog in order to obtain 30% by weight of $Al_2O_3$, CaO and $B_2O_3$. The mixture of grog and bond-forming components is then preferably moistened with water (or an aqueous solution containing a minor amount of an organic bonding material to facilitate an increase in grain strength), ordinarily 4% to 8% of water being adequate to produce a mixture capable of being formed into objects. This moistened mass is then preferably pressed to a desired shape and form, pressures of 1,000 to 10,000 p.s.i. being employed in the production of refractory brick. The formed objects are then dried and fired at between about 1700° F. and 2300° F., a preferred range being 1800°–2200° F. The time and temperature conditions during burning should be sufficient to form a glassy bond in situ, the glassy bond acting as a matrix to hold the grain in position. The temperature conditions during firing should not be sufficient to reduce the porosity of the fired object to below 25%, a final porosity within the range 26%–32% being preferred. The fired object has an $Al_2O_3$ content of between 42% and 65% and is preferably between 42% and 52%.

In the following specific examples a refractory kaolinitic grog was employed, falling within the following analyses:

| | Percent |
|---|---|
| $Al_2O_3$ | 42.0–45.0 |
| $SiO_2$ | 52.0–55.0 |
| $Fe_2O_3$ | 0.2–0.5 |
| $TiO_2$ | 2.0–2.5 |
| CaO | 0.0–0.1 |
| MgO | 0.0–0.1 |
| $Na_2O$ | 0.05–0.15 |
| $K_2O$ | 0.1–0.2 |
| $P_2O_5$ | 0.0–0.1 |
| MnO | 0.0–0.1 |
| Ignition loss | 0.0–0.2 |

It may be noted that the above material consists of approximately 57% mullite ($3Al_2O_3 \cdot 2SiO_2$), 14% cristobalite ($SiO_2$) and 30% siliceous glass (amorphous silica).

The bonding components were derived from slaked lime, boric acid and alumina; for example:

6.8 parts $Ca(OH)_2$=5.15 parts CaO=31.0% CaO
9.9 parts $H_3BO_3$=5.57 parts $B_2O_3$=33.7% $B_2O_3$
5.9 parts alumina=5.9 parts $Al_2O_3$=35.3% $Al_2O_3$ Other bonding component formations that can be used include:

| | Percent | | | |
|---|---|---|---|---|
| | A | B | C | I |
| CaO | 33.2 | 41.4 | 40.4 | 17 |
| $B_2O_3$ | 51.6 | 36.0 | 30.2 | 16 |
| $Al_2O_3$ | 15.1 | 22.6 | 29.4 | 67 |

It may be noted that bond-forming compositions A to C are representative of the preferred range: Composition I contains an excess of $Al_2O_3$ and during firing of the refractory about one-half of the alumina content does not enter into the formation of the glassy matrix in situ, but instead remains in the form of corundum crystals.

Upon firing the intimate mixture of grog and bond-forming components (in the proportions heretofore stated) the siliceous grain or grog is held by the glassy matrix but is not dissolved therein. Some crystalline anorthite may be observed. The completed refractory will have a representative porosity of 25% to 35%, and a bulk density of 110 to 130 lbs. per cu. ft. A representative run produced brick having a cold crushing strength of 7935 p.s.i. and a modulus of rupture of 1513 p.s.i.; the brick had a bulk density of 113.6 lbs. per cubic ft., a water absorption of 14.9%, an apparent porosity of 27.1% and a coefficient of thermal expansion (24° to 700° C.) of $5.23 \times 10^{-6}$ per ° C.

The above stated properties are typical of the refractory produced by the present invention; however, the properties will vary depending upon the percent of bond in the refractory. This is shown in the following table:

EFFECT OF PERCENT BOND ON THE POROSITY AND OTHER PROPERTIES OF THE CALCIUM BORO-ALUMINATE BONDED ALUMINUM MELTING REFRACTORY

| | I | II | III |
|---|---|---|---|
| Percent bond | 9.9 | 18.1 | 30.8 |
| Absorption, percent | 14.7 | 14.3 | 19.2 |
| Porosity, percent | 27.4 | 26.3 | 32.3 |
| Bulk density, lb/ft.³ | 116.3 | 115.0 | 105.1 |
| Remarks | (1) | (2) | (3) |

[1] Slight aluminum penetration 1/16″ to 1/8″.
[2] Very slight aluminum penetration 1/32″ to 1/16″.
[3] Brick starting to bloat; slight penetration.

In the foregoing table, the bonding component of each of the refractory was as follows: 43.5% by weight of boric acid, 30.4% by weight of hydrated lime ($Ca(OH)_2$) and 26.1% by weight of alumina ($Al_2O_3$). The same kaolinitic grog was employed as in the previous examples, the constituency of such grog being set forth in column 3, lines 55–69 hereof. The kaolinitic grog is uniformly mixed with the bonding components and a small amount (about 1% by weight based on the total composition) of lignosite is added to bond the material while it is being pressed. Thereafter, about 7% by weight of water is added to the above mixture, then pressed at a pressure of 5,000 p.s.i. to form bricks. The thus formed bricks were fired at 1800° F. with a three hour soak. As is apparent from the foregoing table, all of the bricks had a very high porosity. In contrast thereto, bricks made from a pre-formed glass (as opposed to forming a glass bond in situ), as set forth in the McDonald et al. Patent No. 2,997,402, have a very low porosity of about 17.5% and a water absorption percent of 6.3. The bulk density of the McDonald et al. brick is about 174.1 lb/ft.³.

When the refractories of this invention are subjected to the action of molten aluminum and its alloys (such as 7075) for 7 days at 1400° F., the maximum penetration of the refractory did not exceed 1/8 inch and appeared to vary between 0 inch and 1/16 inch. The mechanism of penetration appears to be a slow grain by grain attack upon the grog, not upon the glassy bond. The black reaction product (silicon metal plus silicon-aluminum alloys) is observed to replace complete grains of grog only. The test refractories were free of dross (aluminum oxide) build-up.

The ready availability and low cost of the fire-clay type of grog and of the bond-forming components, the ease of control and manufacture, and the splendid performance and characteristics of the fired refractory of this invention, provide the ceramic industry and the aluminum melting industry with an economical and effective solution to their respective problems. It is to be noted that although specific reference has been made to press forming of brick, any method of compacting the compositions of this invention to form brick may be utilized, such as extrusion and molding. The materials and proportions utilized may be employed in forming other objects and linings, as by casting, ramming in place, or any of the other well known methods in the art.

We claim:

1. In a process of making a formed, fired refractory resistant to attack by molten aluminum and its alloys, the steps of:
    intimately mixing between about 70% and 92% by weight of a pre-calcined granular grog containing $SiO_2$ in excess of $Al_2O_3$, with between about 8% and 30% by weight of a finely divided mixture of bond-forming components containing between 0.5% and 69% $Al_2O_3$, 15% and 80% $B_2O_3$ and 15%–45% CaO.
    moistening the mixture of grog and bond-forming components with water, compacting the moistened mixture to form shaped objects, and firing same to form a glassy bond is situ, the firing being insufficient to reduce the porosity of the fired object to below about 25%, the fired object having an $Al_2O_3$ content of between 42% and 65% and exhibiting low thermal conductivity, a low specific heat, and high resistance to the action of molten aluminum and its alloys, the buildup of dross, and to spalling.

2. A process as stated in claim 1 wherein the pre-calcined grog contains between about 52% and 55% $SiO_2$ and between about 42% and 45% $Al_2O_3$.

3. A process as stated in claim 2 wherein the mixture of bond-forming components contains between 0.5% and 45% $Al_2O_3$, between 15% and 80% $B_2O_3$ and between 15% and 45% of CaO, and the fired object has an $Al_2O_3$ content of between 42% and 52%.

4. A process as stated in claim 1 wherein the amount of pre-calcined granular grog is between about 75% and 90%.

5. A process as stated in claim 1 wherein the pre-calcined grog is of graded particle size, not over 20% thereof remaining on a 10 mesh sieve and not over 25% passing a 65 mesh sieve, and virtually all of the bond-forming components pass a 100 mesh sieve.

6. A process as stated in claim 1 wherein the source of CaO is a member selected from the group consisting of calcium hydroxide, calcium sulfate and calcium acetate.

7. A process according to claim 1 wherein the source of CaO is calcium hydroxide.

8. A process according to claim 1 wherein the firing temperature is between about 1800° F. and 2200° F. and the porosity of the fired object is between about 25% and 35%.

9. A preformed and fired refractory object having low thermal conductivity, low specific heat, a porosity of from 25% to 35%, an improved resistance to the action of molten aluminum and its alloys, said refractory being characterized by content of between 70% and 92% by weight of particles of kaolinitic, calcined grog material,
    said grog particles containing silica in excess of alumina,
    the remainder of the object being a glassy, non-siliceous matrix of calcium-boro-aluminate, said glassy matrix having been formed in situ and being substantially non-reactive with molten aluminum, the total $Al_2O_3$ content of the refractory being 42% and 52%.

10. A refractory as stated in claim 9 wherein the grog particles contain between about 52% and 55% of $SiO_2$ and between about 42% and 45% $Al_2O_3$, and the fired refractory has a porosity between about 26% and 32%.

References Cited

UNITED STATES PATENTS 2,997,402   8/1961   McDonald et al. _____ 106—63

JAMES E. POER, Primary Examiner

U.S. Cl. X.R.

106—65, 67

UNITED STATES PATENT OFFICE
CERTIFICATE OF CORRECTION

Patent No. 3,471,306

October 7, 1969

Jack Alvin Rubin et al.

It is certified that error appears in the above identified patent and that said Letters Patent are hereby corrected as shown below:

Column 5, line 33, "45% CaO." should read -- 45% CaO --. Column 6, lines 34 and 35, "content of the refractory being 42% and 52%." should read -- content of the refractory being between 42% and 52%. --.

Signed and sealed this 18th day of August 1970.

(SEAL)
Attest:

Edward M. Fletcher, Jr.
Attesting Officer

WILLIAM E. SCHUYLER, JR
Commissioner of Patents